Figure 1:

Aug. 2, 1960     J. S. HILL     2,947,114
COMPOSITE MATERIAL
Filed May 9, 1957

INVENTOR.
JAMES S. HILL
BY Karl Huber
James E. Bryan
ATTORNEYS

United States Patent Office 2,947,114
Patented Aug. 2, 1960

2,947,114
COMPOSITE MATERIAL

James S. Hill, Cranford, N.J., assignor to Engelhard Industries, Inc., a corporation of New Jersey Filed May 9, 1957, Ser. No. 658,167

3 Claims. (Cl. 49—53)

The present invention deals with a composite material and more particularly with a composite material comprising a noble metal as a component thereof.

The noble metals, including the platinum group metals, gold, silver, and alloys of such metals, are inherently substantially resistant to oxidation and corrosion under high temperatures, e.g. temperatures exceeding about 900° C.

However, for various applications, especially for high temperature applications, where noble metals are highly desirable, particularly the platinum group metals, the use of such metals is rather costly and often the more economical but decidedly inferior base metals, or alloys thereof, are substituted for the desirable noble metals. In certain applications the substitution of base metals for noble metals is not permissible and no compromise can be made for the sake of economy.

For applications under lower temperatures, e.g. temperatures below about 900° C., the noble metals can be provided with a backing of base metals or base metal alloys, but such composite materials do not lend themselves for high temperature applications because when the noble metals are bonded to the base metals and employed under high temperatures there is an interdiffusion of the metals which deleteriously affects the noble metals. For example, in the case of crucibles, bushings for processing glass, conduits for high temperature highly corrosive mediums, etc., it would not be desirable to employ noble metals bonded to base metals because the interdiffusion of the metals would effect substantial deterioration of the noble metals which subjects the medium in contact with the composite metals to contamination, such, for example, as the contamination of molten glass by base metal diffusing through the noble metal layer. Otherwise, the useful life of the noble metal layers is substantially limited. Were it not for the above mentioned disadvantages, the lamination of a noble metal within a base metal, for example platinum and nickel, would permit considerable economy in that the nickel backing would permit the use of platinum having only a fraction of the thickness ordinarily employed. The use of platinum alone below a critical thickness does not possess sufficient rigidity for maintaining shape and form under certain applications. This applies to the noble metals generally.

Figure 2:
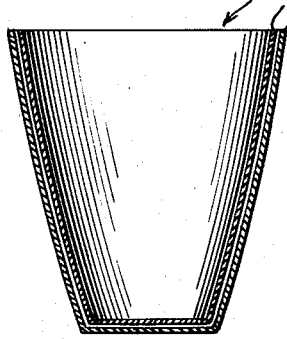
Figure 3:
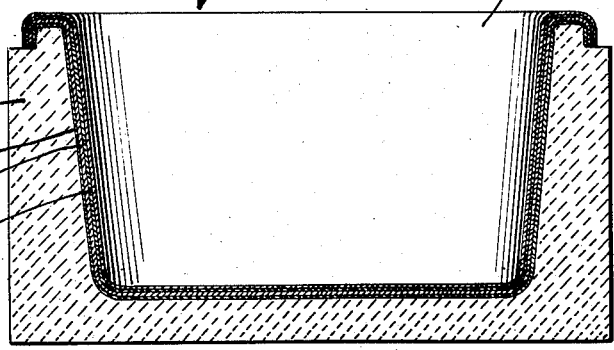
Figure 4:
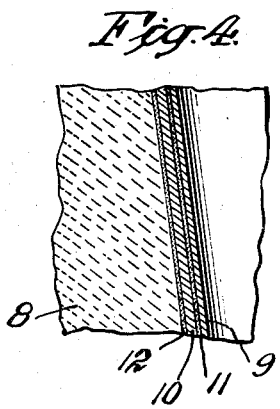
Figure 5:
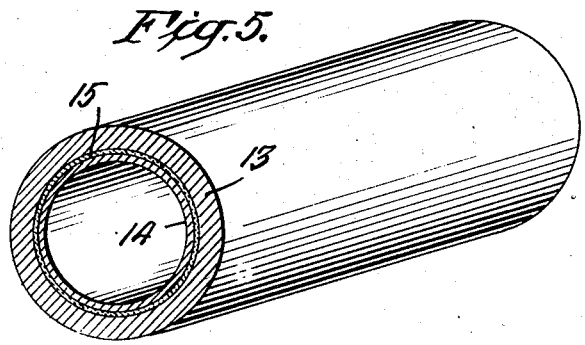

It is an object of the present invention to provide a composite material comprising a noble metal as a component thereof. It is another object to provide a composite material comprising a plurality of metal layers at least one of which is a noble metal layer. It is a further object of the present invention to provide a composite material which permits economical use of the noble metals especially for high temperature application. Other objects and advantages of this invention will become apparent from the description hereinafter following and the drawings forming a part hereof, in which:

Figure 1, illustrates a perspective view of a composite material according to this invention, Figure 2, illustrates a cross-sectional view of a crucible according to the invention, Figure 3, illustrates a cross-sectional view of a container for high temperature molten substance, Figure 4, illustrates an enlarged fragmentary view of Figure 3, and Figure 5, illustrates a perspective view of a conduit for high temperature fluid materials.

The present invention relates to a composite material comprising a layer of noble metal and a layer of base metal with a barrier layer therebetween, or a plurality of noble metal layers with a barrier layer therebetween, whereby interdiffusion of the metal layers is greatly reduced or eliminated by means of the barrier layer and whereby the noble metal may be provided as a thinner layer than heretofore possible yet with sufficient rigidity as a result of the supporting base metal or other metal layer.

Referring to Figure 1, the composite material comprises a layer 1 of noble metal such as a platinum group metal, e.g. platinum, or gold or silver and including alloys of such noble metals, and a base metal layer 2 such as a layer of nickel, brass, stainless steel, inconel, etc.; with a barrier layer 3 therebetween. Specifically, the barrier layer is composed of a refractory oxide in the fused state, said refractory oxide being preferably selected from the group consisting of fused alumina and zirconia substantially free of silicon compounds. By "substantially free of silica compounds" it is intended that the refractory oxide in the applied fused state contains less than one percent of silicon compounds e.g. silica, with the said preferred oxide constituting at least 99% by weight of the total oxide composition. For example, the effective oxides include among others the fusible refractory oxides of aluminum and zirconium with or without an admixture of supplemental oxides such as CaO and $SiO_2$ in an amount less than one percent by weight of the composite oxide. Other fuseable refractory oxides having the refractory properties of alumina and zirconia may also be employed especially in the case of a composite material comprising a gold or silver layer, or alloys thereof, and such oxides may tolerate an amount of silicon compounds in excess of one percent, but in the case of the platinum group metals the refractory oxide contains less than one percent of silicon compounds in view of the affinity of, for example, platinum to silicon. The oxides of silicon reduce at least partly in the presence of platinum at high temperatures with the result that silicon alloys with the platinum and lowers the melting point thereof.

In applying the barrier oxide layer, a surface of one of the layers 1 and 2 is preferably roughened, as by sand blasting, and molten oxide is sprayed under pressurized gas over the roughened surface. For example, the powdered oxide such as alumina is passed into an oxyacetylene or oxyhydrogen flame where it melts in such flame and the molten oxide is deposited by spraying onto the said roughened surface of the metal. Preferably, the spray is pressurized sufficiently to produce substantial impact of the molten oxide against the metal during coating. Also, in the absence of a roughened metal surface, the coating is less adherent to the metal and does not provide for a desirable integral coating or sufficient mechanical interlocking of the solidified molten oxide with the metal surface to provide for an integral bond.

Having provided a material according to Figure 1, the noble metal layer 1, supported by means of the layer 2, may be fabricated as a thin noble metal layer the thickness of which may be of the order of foil thickness and which is effectively protected against interdiffusion with the layer 2 by the refractory fused oxide layer 3. However, noble metal layers and base metal layers of any desirable thickness may be employed. For example, the metal layers may have a thickness from about 0.01" to 0.5". Specifically, the composite material may have a noble metal layer of 0.02" thickness and oxide layer of 0.01" thickness and a base metal layer of 0.02" thickness.

Figure 2, illustrates a cross-sectional view of a crucible composed of the composite material of the invention. The crucible 4 is advantageously fabricated by forming a thin cup-shaped liner 5 of a noble metal and another similarly shaped base metal member 6 dimensioned to receive the liner 5 with very little clearance therebetween. Having provided the two cups 5 and 6, either the outer surface of the inner cup 5 or the inner surface of the outer cup 6, or both, are roughened, as by sand blasting, and one or both of the cups are coated with the fused oxide in the manner described with respect to Figure 1. After coating, the two cups are nested together with a snug fit.

Figures 3 and 4, illustrate the material of the invention in the form of a container for high temperature molten substances such as molten glass. The container comprises preferably a pot 7 recessed into a refractory body 8, e.g. a ceramic body, shaped to receive the pot 7. The pot 7 comprises the material of this invention, preferably a thin liner 9 of platinum nested into a similarly shaped support member 10 of nickel with the fused oxide barrier layer 11 therebetween and with a layer 12 of the fused oxide on the nickel support 10 between the ceramic body 8 and said nickel support 10.

The said fused oxide layers 11 and 12 are provided in the manner described with respect to Figure 3.

Figure 5, illustrates a modification of the invention in that the composite material is in the form of a pipe or tubing composed of a plurality of concentric tubes or pipes with a layer of the refractory fused oxide therebetween. For example, a base metal outer tube 13 is provided with a noble metal inner liner tube 14 with the fused oxide layer 15 therebetween. The noble metal liner 15, for example a liner composed of gold or silver or alloys thereof is first roughened on its outer surface and such surface is provided with an oxide coating in the manner described with respect to Figures 2 and 3. Thereafter base metal tube 13 is positioned over the coated tube 14 by telescoping or otherwise whereby a composite pipe or tubing is formed.

The invention has been described particularly as a combination of base metal and noble metal components with the oxide layer therebetween, however, it is intended to include the compositing of a plurality of noble metal layers in the form of cups, tubes, etc., with the fused layer therebetween. For example, the layers 2, 6 and 10 may be noble metal layers or base metal layers, and the said noble metal layers comprising the composite material may be of identical composition or a combination of different noble metals or alloys thereof.

While the invention has been described in relation to the specific illustrations, other modifications are contemplated within the scope of the appended claims.

What is claimed is:

1. A container for handling glass comprising a plurality of nested cup-shaped members, the inner member being a platinum member, the outer member being a base metal member, a fused refractory oxide selected from the group consisting of alumina and zirconia between said members, a hollowed refractory base supporting said nested members, and a fused refractory oxide between said outer member and said refractory base.

2. A container for handling glass comprising a plurality of nested cup-shaped members, the inner member being a platinum member, the outer member being a base metal member, a coating of a fused refractory oxide selected from the group consisting of alumina and zirconia on at least one of the members and positioned therebetween, the members being nested together with a snug fit, and a hollow refractory base supporting said nested members.

3. Glass handling apparatus comprising a plurality of metal members nested one within the other, one of the members being shaped to contain the other, one of the members being a platinum member, the other member being a base metal member, a coating of a fused refractory oxide selected from the group consisting of alumina and zirconia on at least one of the members and positioned therebetween, the members being nested together with a snug fit.

References Cited in the file of this patent

UNITED STATES PATENTS

| 1,043,579 | Eldred | Nov. 5, 1912 |
| 2,195,436 | Weller | Apr. 2, 1940 |
| 2,449,952 | Pridham | Sept. 21, 1948 |
| 2,759,854 | Kilby | Aug. 21, 1956 |
| 2,777,254 | Siefert et al. | Jan. 15, 1957 |
| 2,814,657 | Labino | Nov. 26, 1957 |
| 2,843,646 | Conant | July 15, 1958 |